United States Patent [19]

Maness

[11] Patent Number: 5,124,034
[45] Date of Patent: Jun. 23, 1992

[54] LIQUID PURIFICATION SYSTEMS

[75] Inventor: Ronald C. Maness, Richmond, Va.

[73] Assignee: Infilco Degremont Inc., Richmond, Va.

[21] Appl. No.: 662,552

[22] Filed: Feb. 28, 1991

[51] Int. Cl.$^5$ .................. B01D 21/26; B01D 45/12
[52] U.S. Cl. ...................... 210/195.3; 210/202; 210/21; 210/512.3; 210/5; 210/197; 209/160
[58] Field of Search ............ 210/194, 195.1, 195.3, 210/197, 512.1, 512.3, 532.9, 533, 534, 536, 202, 205, 207, 221.2, 713, 715, 738, 787, 788, 803; 209/160, 161

[56] References Cited

U.S. PATENT DOCUMENTS

| | | | |
|---|---|---|---|
| 2,353,358 | 7/1944 | Prager | 210/715 |
| 2,653,801 | 9/1953 | Fontein et al. | 209/144 |
| 2,874,118 | 2/1959 | Albertsen | 210/512.1 |
| 3,235,090 | 2/1966 | Bose et al. | 209/144 |
| 4,146,471 | 3/1979 | Wyness | 210/715 |
| 4,372,766 | 2/1983 | Andrepont | 210/512.1 |
| 4,726,686 | 2/1988 | Wolf et al. | 210/512.1 |

OTHER PUBLICATIONS

Brochure "Densa Deg High Rate Clarifier and Thickener", Infilco Degremont Inc., Mar. 1990 New Information, No. DB-555.

*Primary Examiner*—Stanley S. Silverman
*Assistant Examiner*—Neil M. McCarthy
*Attorney, Agent, or Firm*—Carroll F. Palmer

[57] ABSTRACT

New systems for the purification of liquids containing suspended solids and/or dissolved solid materials basically include a conical flocculator unit and a conjoined conical clarifier unit. The flocculator has a cylindrical lower portion, frustum middle portion and large diameter cylindrical top portion while the clarifier is essentially a large diameter cylindrical top portion over a lower frustum portion. Water or other liquid to be purified enters the flocculator lower portion via opposed, unequally sized nozzles to assume a helical flow upward past a series of deflector plates positioned at the top of the lower flocculator portion while a sludge blanket forms therein. A double flume plus slot arrangement located at the junction of the flocculator with the clarifier separates solids from liquid as fluid flow from the flocculator passes into the clarifier where it is subjected to further separation of sludge from clarified liquid with part of the sludge being recycled to the flocculator. New purification methods operated with the new systems are also disclosed.

12 Claims, 8 Drawing Sheets

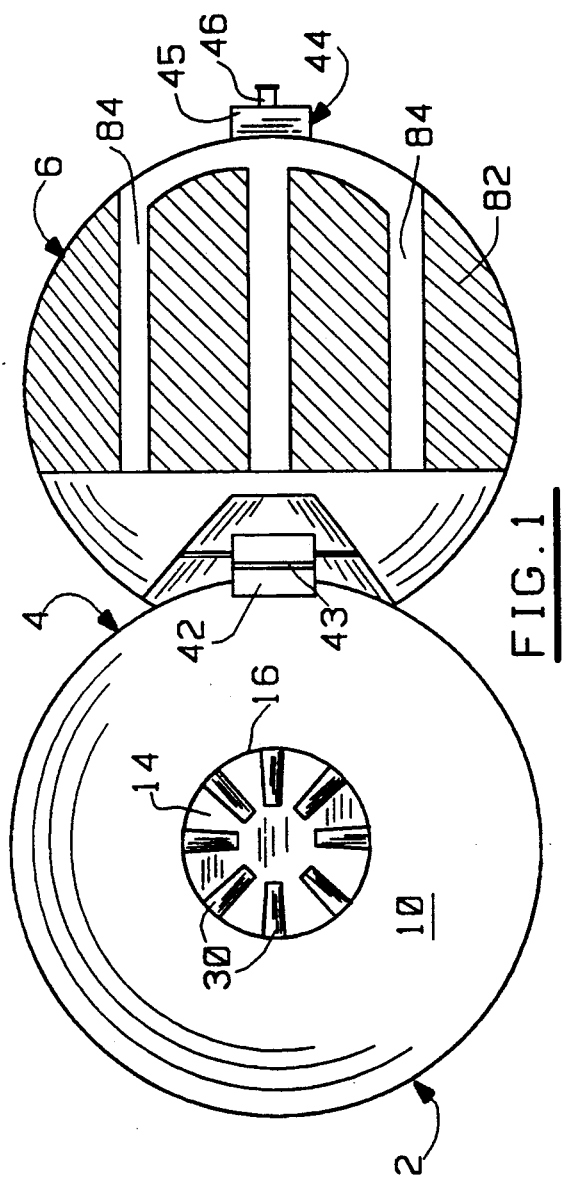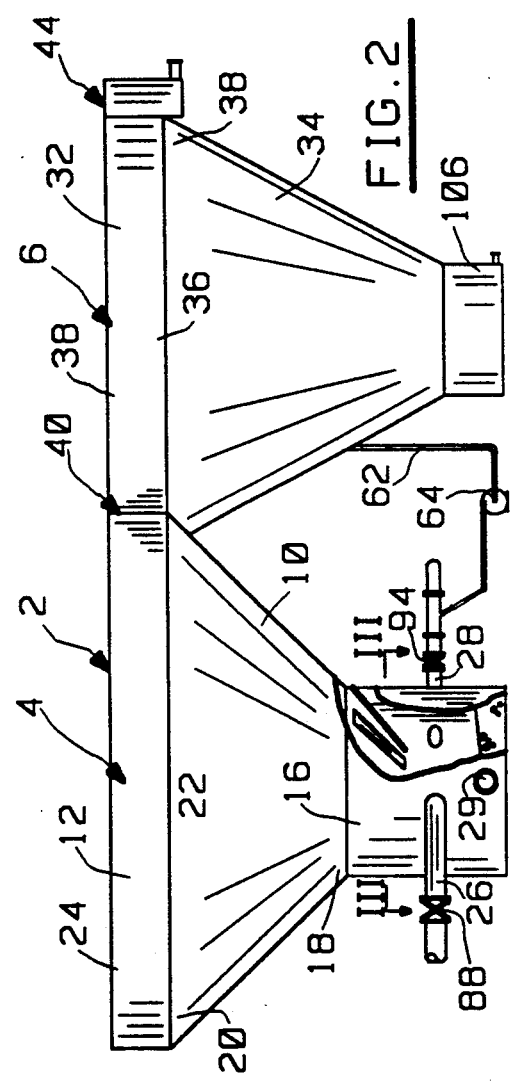

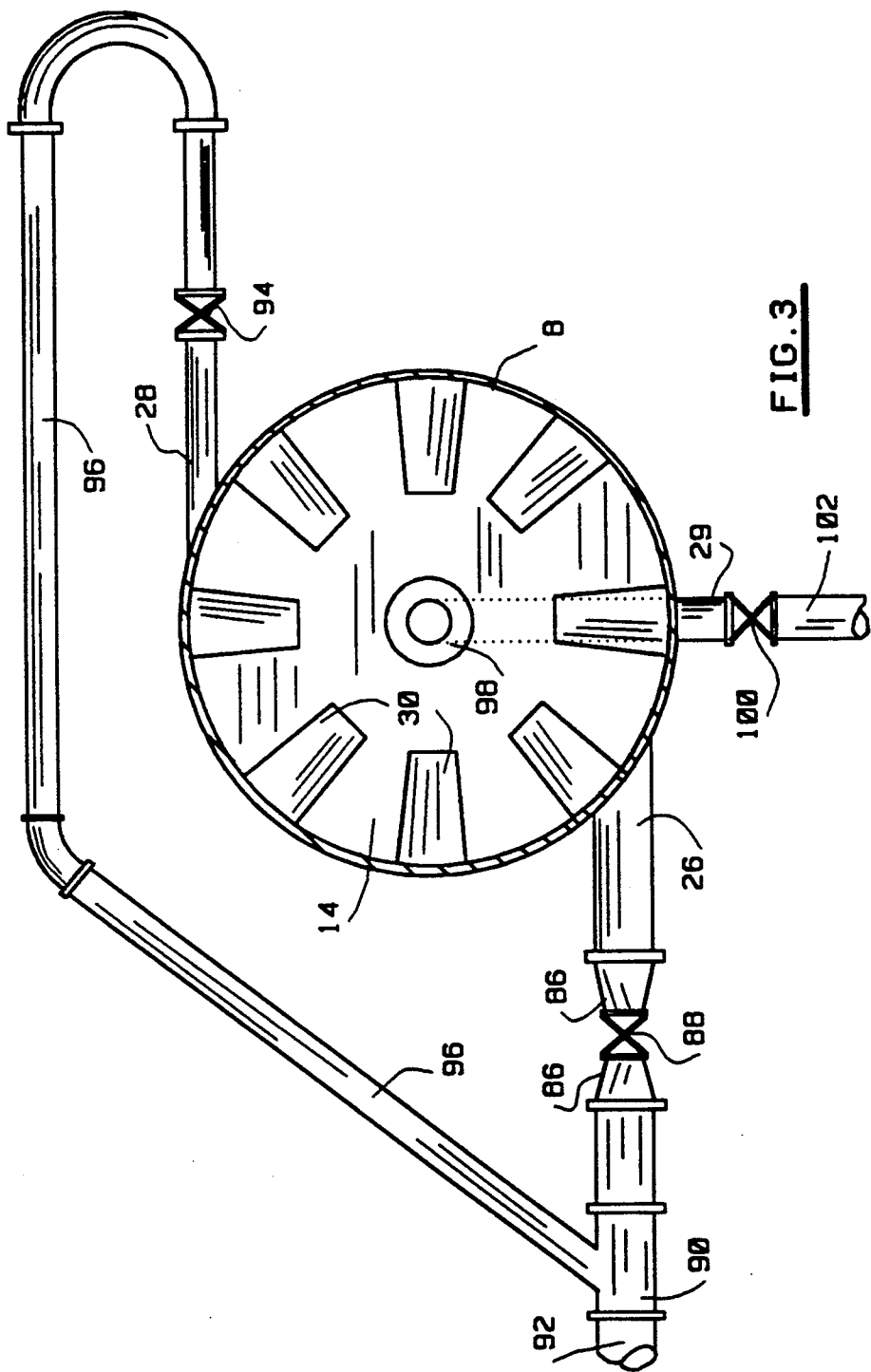

5,124,034

LIQUID PURIFICATION SYSTEMS

BACKGROUND OF THE INVENTION

1. Field of the Invention

This application relates broadly to liquid purification systems and methods, such as treating water to clarify it for potable or industrial use. More particularly, it concerns flocculator/clarifier systems and methods for treating water and other liquids contaminated with suspended solids and/or dissolved solid materials.

2. Description of the Prior Art

Huge volumes of liquids must be treated daily to remove suspended solids and/or dissolved solid materials so that they will be rendered acceptable for potable or industrial use. A prime example is the daily treatment by municipalities of vast quantities of water from a variety of sources containing suspended solids which must be removed before the water can delivered to their customers. However, there are many other types of liquids handled in large quantities that must be treated to remove suspended or dissolved solids.

Numerous different types of equipment have been developed for treating large volumes of liquids for solids removal in an efficient and economical manner. One leading industrial type is marketed by Infilco Degremont Inc., the assignee of the present invention, under the trademark DensaDeg ® Clarifier which is described in an IDI brochure No. DB-555, dated March 1990, the contents of which are incorporated herein by reference. This equipment combines mixing, internal and external solids recirculation, sludge thickening and lamellar clarification, in two conjoined vessels. The design of the treatment vessels is such that each compliments the performance of the other to the point that either vessel requires the other in order to optimize unit operation and treatment results. One of the conjoined vessels is a so-called reactor into which influent is charged and acted upon by a motor driven turbine running within a draft tube.

The present invention provides improvements to the DensaDeg ® Clarifier by the elimination of the motor driven turbine with attendant savings in maintenance of the turbine and related elements operating submerged in an adverse environment. Thus, a great concern with any clarifier type equipment is the formation of scale in lime addition applications. With mechanical units, which employ turbine blades, shafts, etc., which expose a lime slurry (in turbulence) to air, there is a greater tendency to form scale than where the slurry is hydraulically driven without exposure to air.

Liquid treatment systems for suspended solids removal that are hydraulically driven for admixture of flocculants and other treating chemicals with the influent are known, e.g., see U.S. Pat. No. 4,146,471; 4,765,891 and a brochure of the Walker Process Corporation of Aurora, Ill. entitled ClariCone TM (Bulletin 5W85). The present invention provides an improved form of hydraulically driven liquid treatment apparatus.

OBJECTS

A principal object of this invention is the provision of improvements in liquid purification systems and methods.

Further objects include the provision of:

1. An improved liquid purification system of a two conjoined vessel type that performs mixing, internal and external solids recirculation, sludge thickening and lamellar clarification.

2. Such systems that can be of shorter profile, operate at higher rates and with reduced maintenance requirements as compared with related, prior known systems.

3. An improved liquid purification method that uses hydraulic driving for performing chemical and influent mixing.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of systems for the purification of liquids containing suspended solids and/or dissolved solid materials which comprise a flocculator unit and a clarifier unit, both units being of substantially equal height.

The flocculator unit is defined by first, second and third geometric portions assembled vertically along a first central vertical axis. The first portion is lowermost and is defined by a cylinder of a first diameter having a closed bottom end and an open upper end. The third portion is uppermost and defined by a cylinder of second diameter larger than the first diameter having a open lower end and an open top end. The second portion is defined by an inverted frustum having an open low end of diameter equal to the first diameter and an open top end of diameter equal to the second diameter, the top end being integrally joined to the third portion lower end and the low end being integrally joined to the first portion upper end.

There is a first horizontal, tangential tubular inlet into the first portion having a third diameter, a second horizontal, tangential tubular inlet into the first portion diametrically opposed to the first inlet and having a fourth diameter smaller than the third diameter, and a series of blades mounted adjacent to the upper end of the first portion that extend toward its center at an acute angle relative to the horizontal.

The clarifier unit comprises fourth and fifth geometric portions assembled vertically along a second central vertical axis. The fourth portion is uppermost and defined by a fragmented cylinder of fifth diameter having a open lower end and an open top end.

The fifth portion is of inverted conical shape and has an open top end of diameter equal to the fifth diameter, the top end being integrally joined to the fourth portion lower end.

The fragmented cylinder of the fourth portion of the clarifier unit is joined to the cylinder of the third portion of the flocculator unit forming a junction area between the flocculator unit and the clarifier unit.

There is flume means in the junction area for transfer of effluent from the flocculator unit into the clarifier unit and effluent means in the clarifier unit for discharging clarified liquid though on opening in the fourth portion of the clarifier unit.

The clarifier unit further comprises a sludge flume defined by a trapezoidal plate, a pair of dependent sides, a section of the inner wall of the fifth portion to which the pair of sides are fastened, an open top end and an open bottom end.

The third portion cylinder contains in the transfer area a flocculant transfer slot through which sludge may pass from the flocculant unit into the open top end of the sludge flume.

Sludge collector means is positioned in the fifth portion to receive sludge passing out of the open bottom end of the sludge flume. In a first embodiment, such sludge collector means comprises a funnel, a conduit connected to the funnel that exits the clarifier unit through the wall of the fifth portion to connect with the flocculator unit for discharge of sludge into the flocculator unit and a pump connected into the conduit for forcing sludge through the conduit.

In a second embodiment, the sludge collector means comprises a funnel, a stackpipe connected to the funnel and extending vertically therefrom and large bubble generator means for introducing large gas bubbles into the stackpipe adjacent to the base thereof to create an upward flow of sludge from the funnel through the stackpipe.

The clarifier unit further comprises a plurality of parallel tubes open at both ends and positioned at an acute angle relative to the second vertical axis in the fourth portion of the clarifier unit through which liquid contained in the fifth portion may pass upwardly. Also, the fourth portion of the clarifier unit contains at least one collection launder positioned above the parallel tubes to receive liquid passing upwardly out of the parallel tubes and convey it to effluent means.

In a preferred embodiment, the effluent means comprises a collection box fixed to the outside surface of the fourth portion cylinder and a discharge conduit in the collection box.

The objects of the invention are further attained by the provision of a new method for the purification of liquids containing suspended solids and/or dissolved solid materials which comprises:

(a) introducing influent liquid to be purified tangentially into a first cylindrical zone of first diameter through first and second diametrically opposed inlet nozzles, the first nozzle having a substantially larger cross-sectional area than the second nozzle, (b) introducing flocculant producing material into the liquid, (c) causing the liquid to move upwardly with helical flow with gradually widening as it progresses upwardly through a frustum zone resulting in gradual decrease in velocity of helical flow and into a second cylindrical zone of second diameter substantially larger than the first diameter positioned above the frustum zone, (d) controlling the volume and velocity of influent liquid flow into the first cylindrical zone so that flocculant which forms in the helically flowing liquid accumulates as a rotating sludge blanket positioned in frustum zone and in the lower section of the second cylindrical zone with a layer of clarified liquid above the sludge blanket in the second cylindrical zone, (e) causing the clarified liquid to flow out of the second cylindrical zone via a horizontal flume into a vertically elongated clarifier zone, (f) causing portions of the sludge blanket to flow out of the second cylindrical zone via a horizontal slotted opening therein located below the level of the flume into the clarifier zone, (g) moving the sludge blanket portions downward in the clarifier zone for discharge therefrom by conduit means, (h) moving the clarified liquid upwardly in the clarifier zone through a plurality of parallel tubes angled with respect to the longitudinal axis of the clarifier zone to produce further clarification of the liquid, and (i) discharging portions of the liquid from the clarifier zone at a level above the plane defined by the top ends of the parallel tubes.

Advantageously, controlling the volume and velocity of influent liquid flow comprises independently adjusting the velocity of fluid flow through the opposed nozzles so that the velocity of flow through one nozzle substantially exceeds the rate of flow through the other nozzle.

Also, the path of the helical flow of the liquid under treatment is partially disturbed by a plurality of blades interposed in the path in the region of the junction of the cylindrical zone with the frustum zone.

BRIEF DESCRIPTION OF THE DRAWINGS

A more complete understanding of the invention can be obtained by reference to the accompanying drawings in which:

FIG. 1 is plan view of a system for the purification of liquids structured in accordance with the invention.

FIG. 2 is a lateral view, partially broken away, of the purification system of FIG. 1.

FIG. 3 is a sectional view taken on the line III—III of FIG. 2.

DESCRIPTION OF THE PREFERRED EMBODIMENTS

Figure 4:
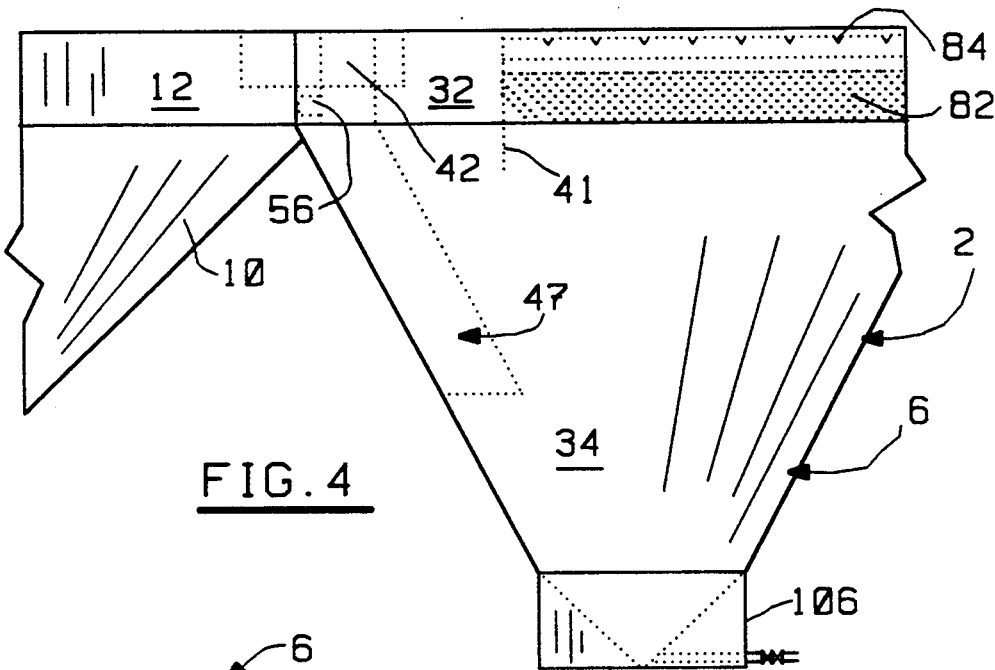
FIG. 4 is a fragmentary, lateral view mainly showing the clarifier unit of the system of FIG. 1.

Referring in detail to FIGS. 1-11 of the drawings, a first embodiment of the purification system 2 of the invention comprises a flocculator unit 4 and a clarifier unit 6.

The flocculator unit is defined by geometric portions 8, 10 and 12 assembled vertically along a central vertical axis. The first portion 8 is a cylinder having a closed bottom end 14 and an open upper end 16. The second portion 10 is an inverted frustum having an open low end 18 of an and an open top end 20.

The third portion 12 is a cylinder having a open lower end 22 and an open top end 24.

The portions 8, 10 and 12 are integrally joined together forming the flocculator unit 4.

There is a first horizontal, tangential tubular inlet 26 into the portion 8 having a third diameter, a second horizontal, tangential tubular inlet 28 into portion 8 diametrically opposed to the inlet 26 having a fourth diameter smaller than the third diameter and a drain nozzle 29.

A series of blades 30 are mounted adjacent the upper end 16 of portion 8 that extend toward its center at an acute angle relative to the horizontal.

The clarifier unit 6 comprises geometric portions 32 and 34 assembled vertically along a second central vertical axis. The fourth portion 32 is a fragmented cylinder of fifth diameter having a open lower end 36 and an open top end 38.

The fifth portion 34 is of inverted conical shape and has an open top end 38 of diameter equal to the fifth diameter which is integrally joined to the fourth portion lower end 36.

The fragmented cylinder 32 is joined to the cylinder portion 12 of flocculator unit 4 forming a junction area 40 (see FIG. 2).

Flume means 42, which includes a flocculant transfer slot 43, located in the junction area 40 serves to transfer partially clarified effluent from the flocculator unit 4 into the clarifier unit 6 while permitting renegade flocculant in the effluent to pass through the transfer slot 43.

Figure 7:
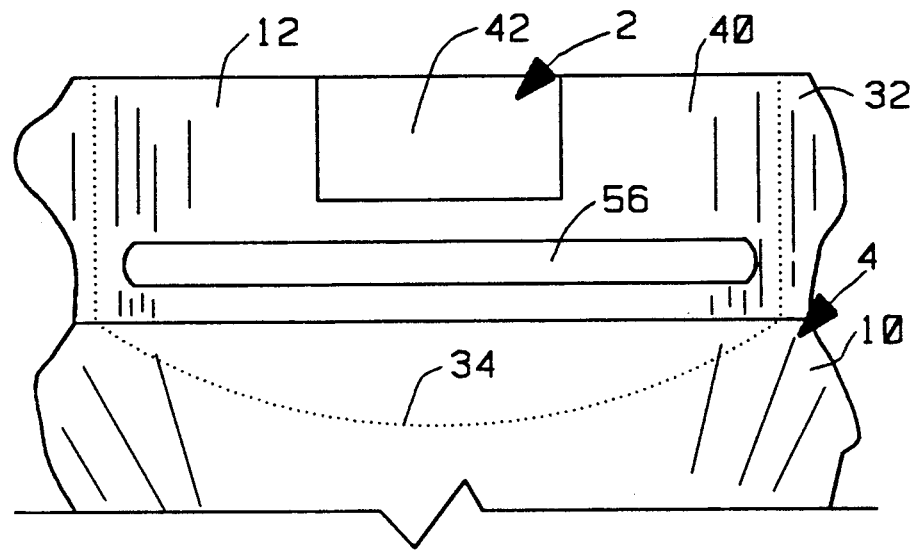
FIG. 7 is an enlarged, fragmentary view of the area of the new purification system where the flocculator unit conjoins the clarifier unit.
Figure 8:
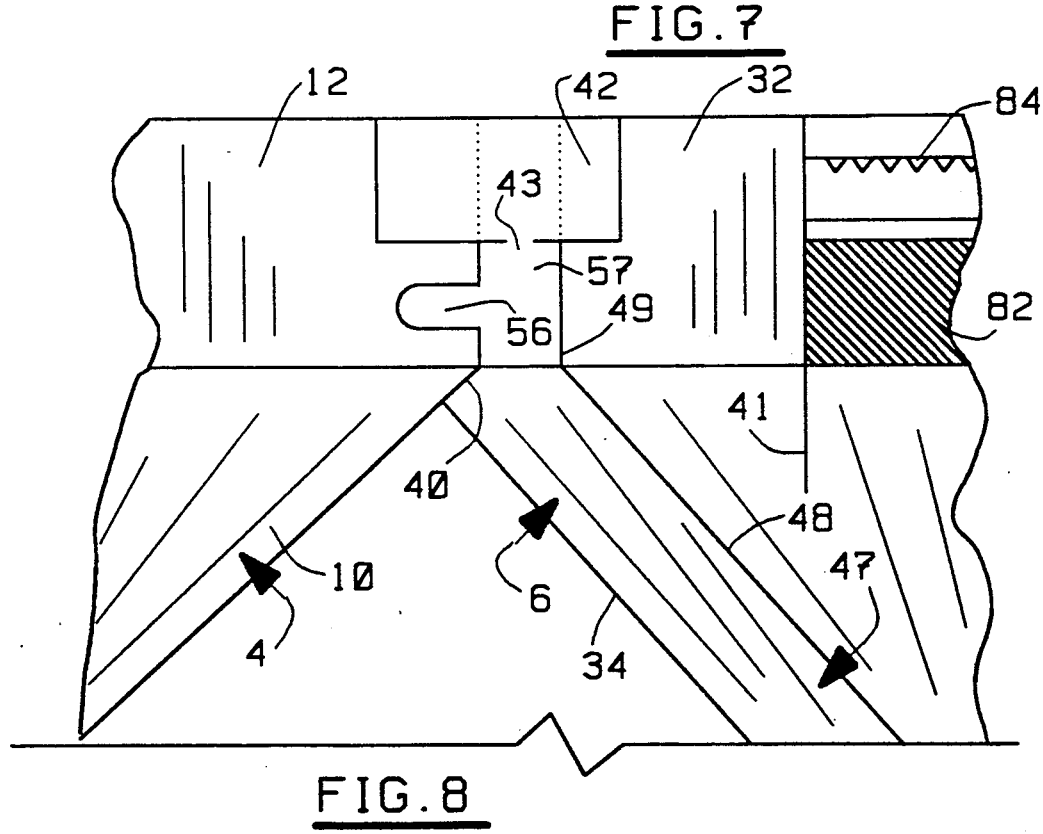
FIG. 8 is an enlarged, fragmentary view similar to FIG. 7 viewed 90° from the view in FIG. 7.

FIG. 7 shows the junction area 40 viewed from inside the flocculator unit 4 with the junction of portion 32 of the clarifier unit 6 with portion 12 of the flocculator unit 4 and the junction portion 34 of the clarifier unit 6 with portion 10 of the flocculator unit 4 shown in dotted lines. FIG. 8 shows the junction area 40 viewed from the outside of units 4 and 6 and the position of the clarification baffle 41.

Effluent means 44 in the clarifier unit 6 discharges clarified liquid through an opening in the portion 32 of the clarifier unit 6. Means 44 comprises an effluent collection box 45 and discharge conduit 46.

The sludge flume 47 in the clarifier unit 6 consists of a trapezoidal plate 48 with an angled upper end 49, a pair of dependent sides 50, a section 52 of the inner wall 54 of the portion 34 to which the pair of sides 50 are fastened, an open top end 53 and an open bottom end 55. The third portion cylinder 12 contains in the transfer area 40 a flocculant transfer slot 56 through which sludge (not shown) may pass from the flocculator unit 4 into the upper top end 57 of the sludge flume 47.

Sludge collector means 58 positioned in the fifth portion receive sludge passing out of the open bottom end 54 of the sludge flume 47.

Figure 9:
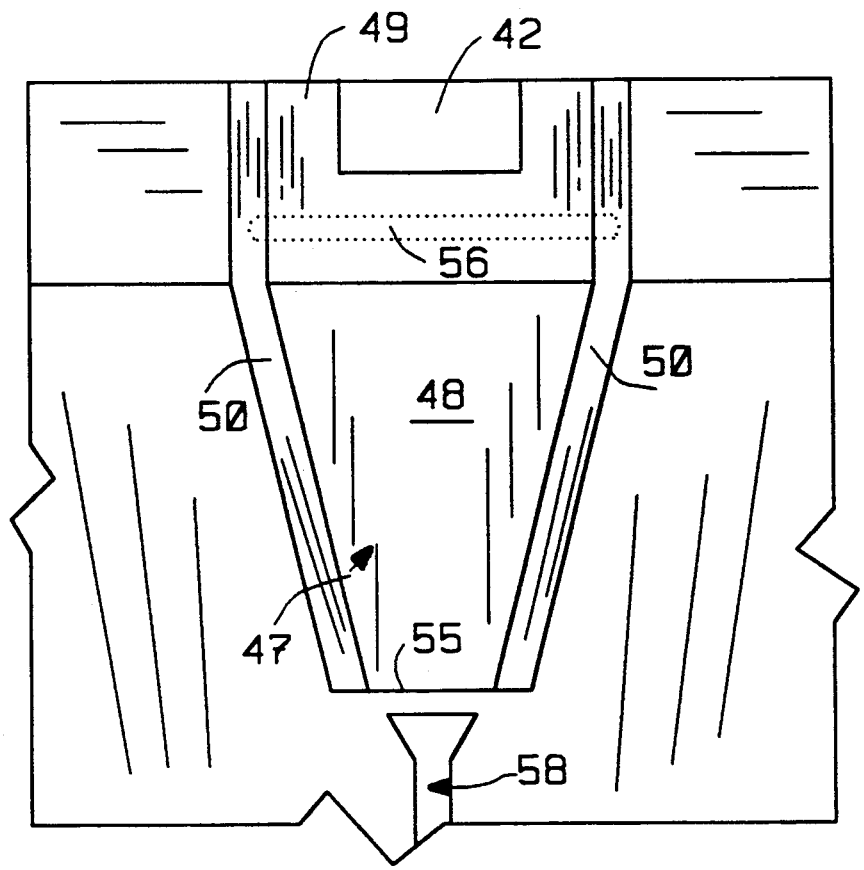
FIG. 9 is an enlarged, fragmentary view from inside the clarifier unit looking toward the flocculator unit.
Figure 10:
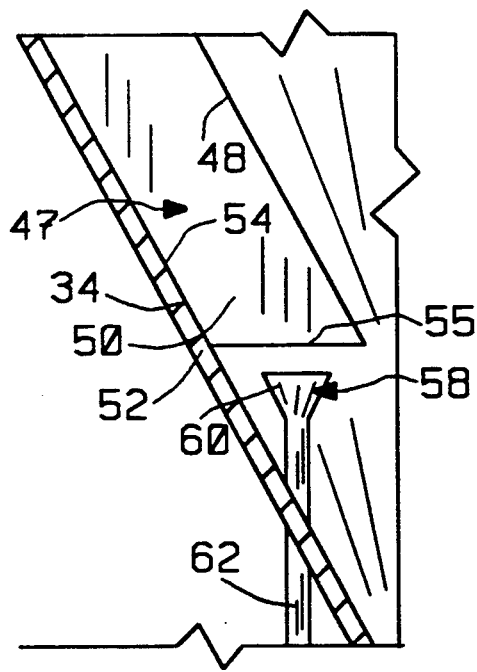
FIG. 10 is an enlarged, fragmentary view similar to FIG. 9 viewed 90° from the view in FIG. 9.
Figure 11:
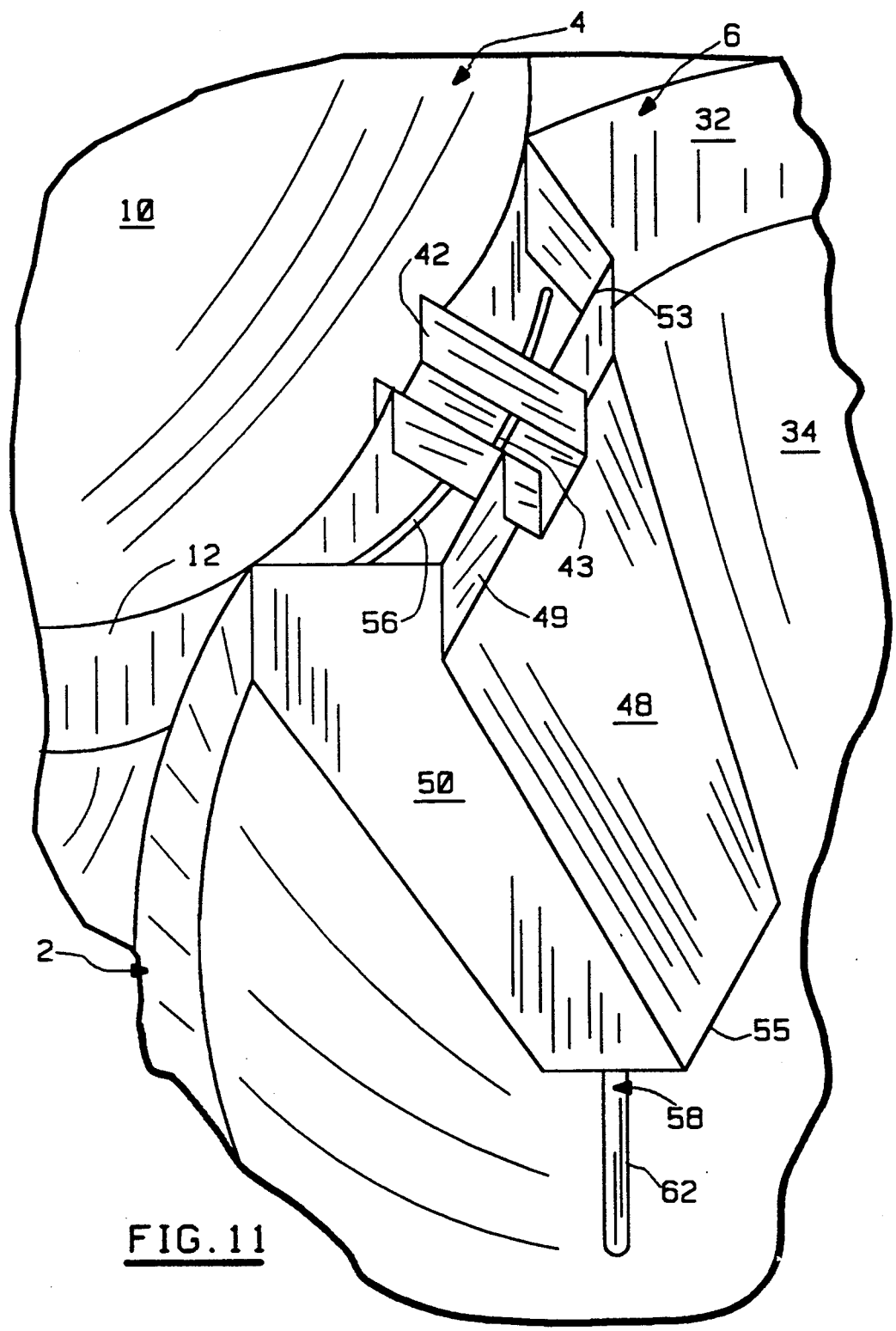
FIG. 11 is an enlarged, fragmentary, isometric view of the area of the system where the flocculator unit conjoints the clarifier unit.
Figure 12:
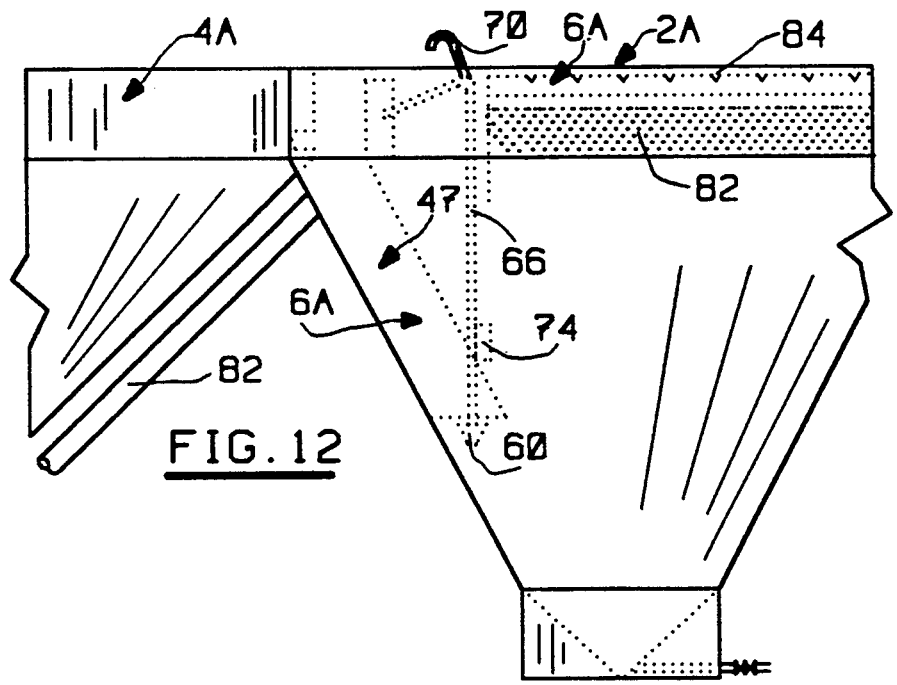
FIG. 12 is a lateral, fragmentary view similar to FIGS. 4 or 10 showing a second embodiment of the system of the invention.
Figure 13:
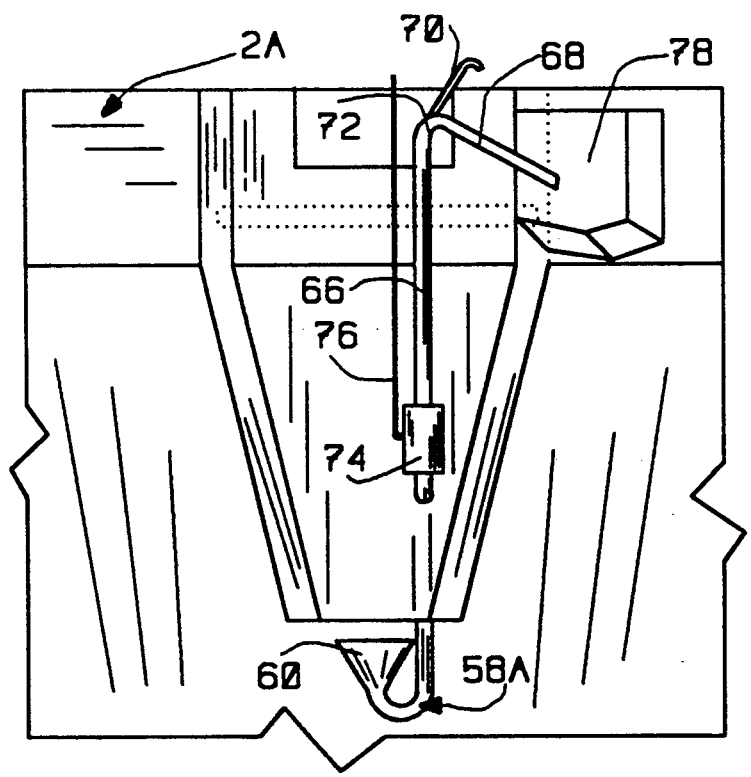
FIG. 13 is a fragmentary view similar to FIG. 9 showing the second embodiment of the system of the invention.
Figure 14:
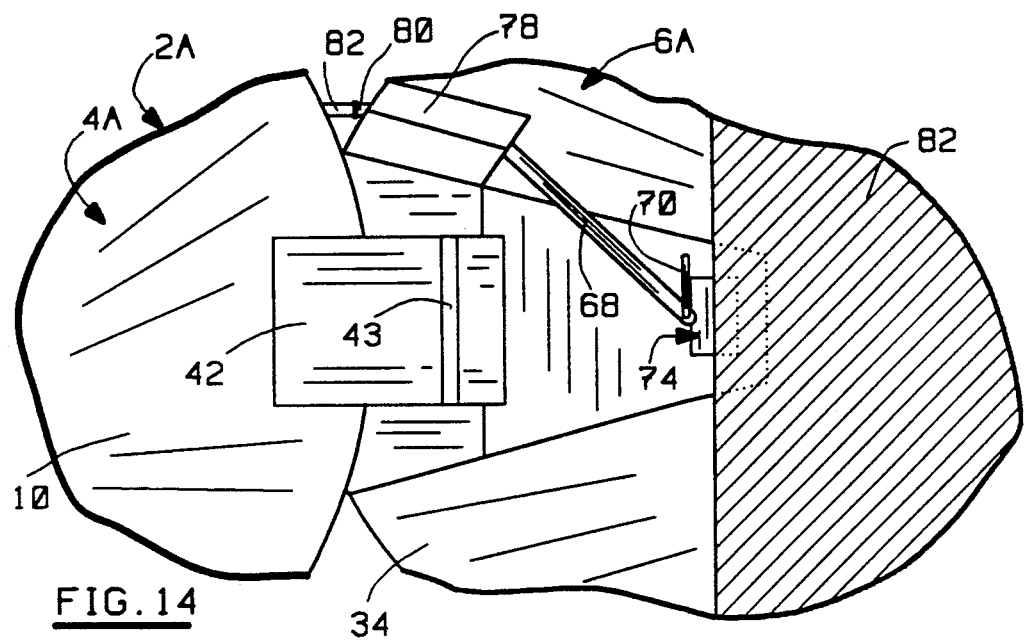
FIG. 14 is a fragmentary, plan view of the junction area between flocculator and clarifier units in the second embodiment of the invention.
Figure 15:
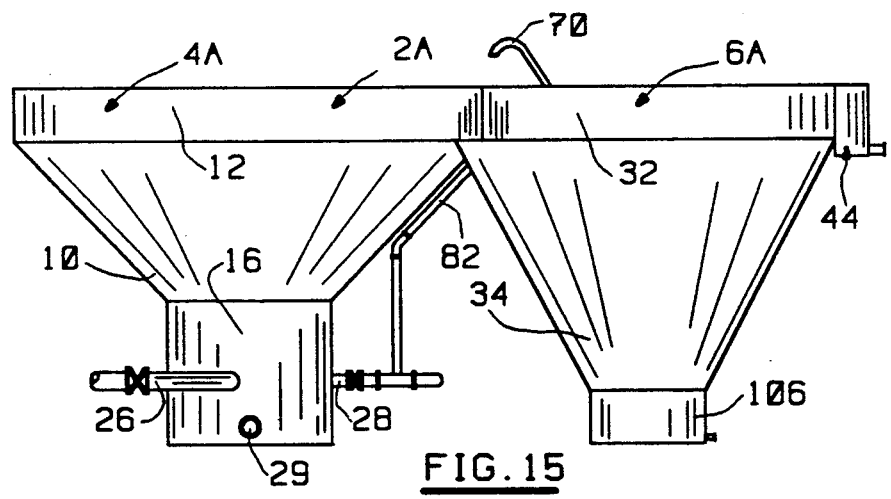
FIG. 15 is a lateral view, similar to FIG. 2, but showing the second embodiment of the invention.

Referring to FIGS. 9 and 10, in a first embodiment, the sludge collector means 58 comprises a funnel 60, a conduit 62 that exits the clarifier unit through the wall 52 of the portion 34 to connect with the flocculator unit 4 for discharge of sludge into it and a pump 64 connected into the conduit 62 for foreing sludge through the conduit 62.

Referring to FIGS. 12–15, in a second embodiment, system 2A comprises a flocculator unit 4A and clarifier unit 6A.

In the system 2A, the sludge collector means 58A comprises a funnel 60, a stackpipe 66 connected to the funnel 60 and extending vertically therefrom to terminate in a discharge section 68. A vent tube 70 is joined to the stackpipe 66 at the top bend 72. There is large bubble generator means 74 for introducing large air bubbles into the stackpipe 66 to create an upward flow of sludge (not shown) from the funnel 60 through the stackpipe 66. A line 76 connects to the bubble generator means 74 for introduction of compressed air into the means 74 for creating the large air bubbles. The bubble generator means 74 and related stackpipe 66 may take a variety of forms as disclosed in U.S. Pat. Nos. 4,187,263; 4,293,506; 4,356,131 and 4,569,804, the disclosures of which are incorporated herein by reference.

The discharge section 68 of stackpipe 66 discharges sludge (not shown) into a sludge head box 78 from which it exits via discharge nozzle 80 connected to recycle pipe 82 that delivers the sludge into tangential tubular inlet 28 for recycle into the flocculator unit 4a.

The clarifier units 6 and 6a further comprise a pluraltiy of parallel (lamellar) tubes 82 open at both ends and positioned at an acute angle relative to the second vertical axis in the portions 32 of clarifier units 6 and 6A through which liquid contained in the portions 34 may pass upwardly. Portions 32 also contain collection launders 84 positioned above the parallel tubes 82 to receive liquid passing upwardly out of the tubes 82 and convey it to effluent means 44. In place of tubes 82, lamellar plates (not shown) may be used as disclosed in Infilco Degremont Inc. brochure no. DB585 entitled Superpulsator ™ Clarifier and dated December 1990, the disclosure of which is incorporated herein by reference.

Figure 5:
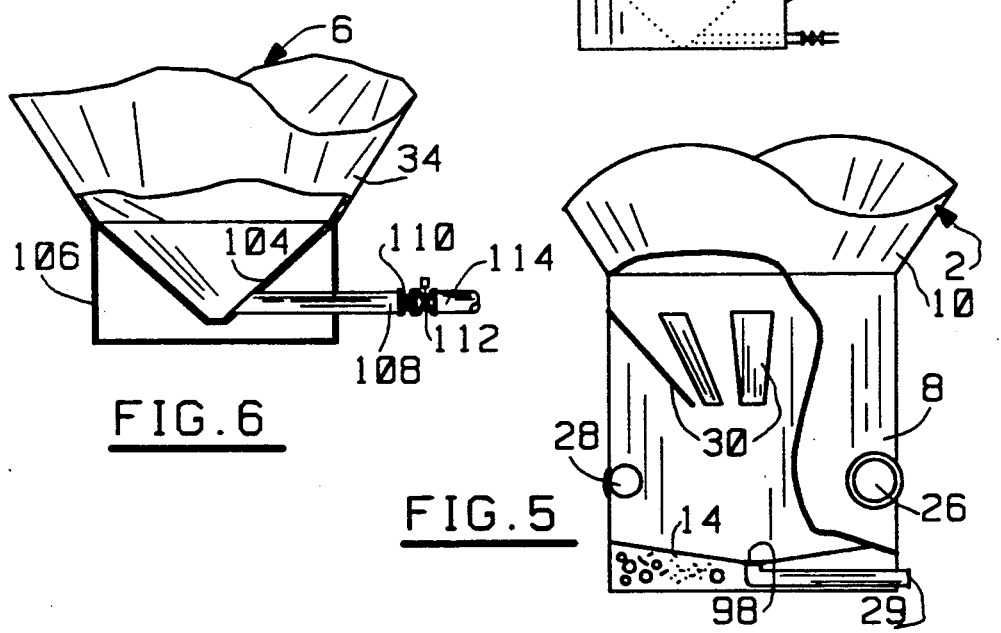
FIG. 5 is an enlarged, fragmentary lateral view of the base portion of the flocculator unit of the new purification system of FIG. 1.

Referring to FIGS. 3 and 5, the first inlet 26 to portion 8 connects via pipe reducers 86, control valve 88 and Y-section 90 to raw water influent pipe 92. Similarly, the second inlet 28 connects via control value 94 and piping 96 with Y-section 90 to influent pipe 92. Typically, valve 88 will be of the automatically operated butterfly type and valve 94 will be of the manually operated butterfly type.

The drain nozzle 29 connects with the inside of cylindrical portion 8 through a flange 98 in its closed bottom 14 and via control valve 100 with the flocculator drain pipe 102. Typically, valve 100 will be a manually operated plug type.

Figure 6:
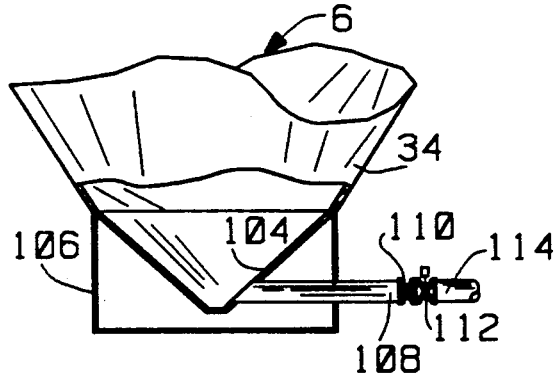
FIG. 6 is an enlarged, fragmentary, partially sectionalized view of the lower portion of the clarifier unit of FIG. 4.

Referring to FIG. 6, the bottom 104 of frustum 34, which is surrounded by support skirt 106, includes a sludge blowdown nozzle 108 that connects via control valves 110 and 112 to the blowdown discharge pipe 114. Typically, valve 110 is a manually operated plug type and valve 112 is an automatically operated plug type.

In operation of systems 2 and 2A, raw water flow enters the bottom portion 8 through the diametrically opposed, horizontal, tangential inlet nozzles 26 and 28. Typically, the nozzles are sized based on velocity of flow, one at 2–3 fps, the other at 8–10 fps. As raw water enters the bottom portion 8, it is caused to rotate rapidly due to the position of the nozzles and the diameter of the cylinder. The rate of rotation is increased or decreased by operation of control valve 88 located before the larger (2–3 fps) inlet nozzle 26, thereby diverting more or less flow through the smaller (8-10 fps) inlet nozzle 28.

As the flow moves upward through the bottom portion 8, it passes through blades 30 which are mounted at the top 16 of the bottom portion 8 and extend toward its center at an angle of approximately 45°. The blades serve two purposes: (1) they act as a static mixer to improve the formation of flocculant, and (2) they dissect the rotational flow vector into smaller, less forceful flow vectors allowing for smoother rotation of the flocculant within the middle portion 10. As the flow moves upward into the portion 10, its rotation gradually slows through the expanding cross section.

The sludge blanket (not shown) which is formed in portion 10 provides an ideal solids contact medium due to its continuous helical rotation. The flocculant particles are forced to travel distances representative of long conventional sedimentation basins. The gradual reduction in rotation is representative of conventional tapered flocculation. As the solids build within the blanket, a distinct sludge separation line between solids and water is developed. In the flocculator units 4 and 4A only a 18-inch (approximate) depth of separated water is maintained above the blanket.

The separated water and flocculant are withdrawn from the flocculator 4 and controlled by the use of two mechanisms. The first mechanism for the withdrawal and control of the separated water is the horizontal flume 42 which connects the flocculator units 4 or 4A to the clarifier units 6 or 6A respectively.

Both separated water and some solids move through the flume 42. Flume 42 terminates at some distance within the clarifier units 6 or 6A. Prior to flowing out of flume 42, the liquid flow encounters the slot 43 cut in the bottom of the flume 42. Slot 43 allows the additional removal of solids from the separated water stream.

The solids move toward the bottom of the clarifier unit 6 or 6A within flume 47, while the separated water (with some flocculant) moves toward the bottom of the clarifier unit 6 or 6a outside of flume 47.

The second mechanism for the withdrawal and control of the separated solids from the flocculator unit 4 is slot 56. The solids discharged through the slot 56 move downward through enclosed sloped flume 47 which terminates at its open bottom end 54. The solids from both the flume 42 and the sloped flume 47 move downward between wall 52 and plate 48 to discharge beneath the flume 47 into a steeply sloped cone bottom 104 of frustum 34.

Thickened solids (not shown) are blown down from the bottom of the clarifier unit 6 or 6a typically by use of two ultrasonic sludge detectors (not shown) which sense high and low sludge levels or by timed interval.

The separated water flowing from the flume 42 moves downward, and travels beneath vertical baffle 41 which separates the lamellar tubes 82 from the zone following flume 42.

Clarified water is collected via the launders 84 placed above the lamellar tubes 82. The collection launders 84 feed collection box 45 with effluent which exists through nozzle 46.

In system 2, sludge is withdrawn from clarifier unit 6 and recycled via funnel 60, line 62, pump 64 and inlet nozzle 28 to the flocculator unit 4.

In system 2, sludge is withdrawn from clarifier unit 6 and recycled via funnel 60, stackpipe 66 and its extension 68 with the assist of bubble generator 74, head box 78, discharge nozzle 80, line 82 and inlet nozzle 28 to the flocculator unit 4A.

An air compressor, at grade or on an elevated platform (not shown), provides compressed air to line 76 to generate the large bubbles which lift the solids through the stackpipe 66. The air can be controlled to increase or decrease the rate of recycle.

The solids in the head box 78 are easily sampled to determine their concentration. The nozzle 80 in the clarifier portion 32, which enters the head box 78, provides the opening through which the collected solids flow into pipe 82 connecting the head box 78 to the inlet nozzle 28 piping to the flocculator unit 4a.

A basic control package for system 2 or 2A (not shown) will typically consist of a potentiometer for operation of the larger inlet nozzle control valve 88, the air compressor and air controls (system 2A only) and the sludge detector controls for sludge blowdown.

THE EMBODIMENTS OF THE INVENTION IN WHICH AN EXCLUSIVE PROPERTY OR PRIVILEGE IS CLAIMED ARE DEFINED AS FOLLOWS:

1. A system for the purification of liquids containing suspended solids and/or dissolved solid materials which comprises:

a flocculator unit and a clarifier unit, both said being of substantially equal height, said flocculator unit being defined by first, second and third geometric portions assembled vertically along a first central vertical axis, said first portion being lowermost and defined by a cylinder of a first diameter having a closed bottom end and an open upper end, said third portion being uppermost and defined by a cylinder of second diameter larger than said first diameter having a open lower end and an open top end, and said second portion being defined by an inverted frustum having an open low end of diameter equal to said first diameter and an open top end of diameter equal to said second diamter, said top end being integrally joined to said third portion lower end and said low end being integrally joined to said first portion upper end, a first horizontal, tangential tubular inlet into said first portion having a third diameter, a second horizontal, tangential tubular inlet into said first portion substantially diametrically opposed to said first inlet and having a fourth diameter smaller than said third diameter, and a series of blades mounted adjacent said upper end of said first portion to extend toward its center at an acute angle relative to the horizontal, said clarifier unit comprising fourth and fifth geometric portions assembled vertically along a second central vertical axis, said fourth portion being uppermost and defined by a fragmented cylinder of fifth diameter having a open lower end and an open top end, said fifth portion being of conical shape and having an open top end of diameter equal to said fifth diameter, said top end being integrally joined to said fourth portion lower end, said fragmented cylinder of said fourth portion of said clarifier unit being joined to said cylinder of said third portion of said flocculator unit forming a junction area between said flocculator unit and said clarifier unit, flume means in said junction area for transfer of effluent from said flocculator unit into said clarifier unit, and effluent means in said clarifier unit for discharging clarified liquid though an opening in said fourth portion of said clarifier unit.

2. The system of claim 1 wherein said clarifier unit further comprises a sludge flume defined by a trapezoidal plate, a pair of dependent sides, a section of the inner wall of said fifth portion to which said pair of sides are fastened, an open top end and an open bottom end.

3. The system of claim 2 wherein said third portion cylinder contains in said transfer area a flocculant transfer slot through which sludge may pass from said flocculant unit into said open top end of said sludge flume.

4. The system of claim 3 wherein sludge collector means is positioned in said fifth portion to receive sludge passing out of said open bottom end of said sludge flume.

5. The system of claim 4 wherein said sludge collector means comprises a funnel, a conduit connected to said funnel that exits said clarifier unit through the wall of said fifth portion to connect with said flocculator unit for discharge of sludge into said flocculator unit and a pump connected into said conduit for forcing sludge through said conduit.

6. The system of claim 4 wherein said sludge collector means comprises a funnel, a stackpipe connected to said funnel and extending vertically therefrom and a large bubble generator means for introducing large gas bubbles into said stackpipe adjacent the base thereof to create an upward flow of sludge from said funnel through said stackpipe.

7. The system of claim 1 wherein said clarifier unit further comprises a plurality of parallel tubes open at both ends and positioned at an acute angle relative to said second vertical axis in said fourth portion of said clarifier unit through which liquid contained in said fifth portion may pass upwardly.

8. The system of claim 7 wherein said fourth portion of said clarifier unit contains at least one collection launder positioned above said parallel tubes to receive liquid passing upwardly out of said parallel tubes and convey it to said effluent means.

9. The system of claim 8 wherein said effluent means comprises a collection box fixed to the outside surface of said fourth portion cylinder and a discharge conduit in said collection box.

10. In a flocculator unit for the purification of influent liquid containing suspended solids that flows upwardly in said unit in a helical path, said unit being defined at the bottom by a cylinder having a closed bottom end and an open upper end and thereabove by an inverted frustum portion, the improvement which comprises:

a first horizontal, tangential tubular inlet into said cylinder, a second horizontal, tangential tubular inlet into said cylinder diametrically opposed to said first inlet and having a diameter smaller than the diameter of said first inlet and valve means to control the relative volume of flow of liquid into said cylinder through said first and second inlets whereby speed of rotation of said liquid in said cylinder is varied by adjustment of said valve means.

11. The flocculator unit of claim 10 further comprising valve means associated with said first and second tubular inlets to independently adjust the velocity of flow of said influent liquid through said inlets whereby to control the nature of said helical flow of liquid in said unit.

12. The flocculator unit of claim 11 further comprising a series of blades mounted adjacent said upper end of said cylinder to extend toward its center at an acute angle relative to the horizontal.

* * * * *